United States Patent [19]

Weinblatt

[11] Patent Number: 4,635,110
[45] Date of Patent: Jan. 6, 1987

[54] PORTABLE VIDEO AND AUDIO EQUIPMENT HOLDER FOR USE IN AN AUTOMOBILE

[76] Inventor: Lee S. Weinblatt, 797 Winthrop Rd., Teaneck, N.J. 07666

[21] Appl. No.: 775,674

[22] Filed: Sep. 13, 1985

[51] Int. Cl.⁴ ............................................. H04N 7/18
[52] U.S. Cl. .................................... 358/93; 358/254; 312/246; 381/86; 455/346; D14/5; D14/79; 224/42.11; 206/335
[58] Field of Search ................... 358/254, 93; 381/86; 455/345, 346, 344; D14/79, 77, 80, 5; 224/42.11; 206/335; 312/245, 246

[56] References Cited

U.S. PATENT DOCUMENTS

| | | | |
|---|---|---|---|
| 2,071,398 | 2/1937 | Frantz et al. | 455/346 |
| 2,665,419 | 1/1954 | Van Orden | 358/254 |
| 2,802,906 | 8/1957 | Goldenberg et al. | 381/86 X |
| 3,944,924 | 3/1976 | Miyachi | 455/345 X |
| 4,090,033 | 5/1978 | Silverstein | 381/86 X |
| 4,490,842 | 12/1984 | Watanabe | 381/86 |
| 4,501,013 | 2/1985 | Sato | 455/345 X |
| 4,525,746 | 6/1985 | Mangold et al. | 358/254 |

FOREIGN PATENT DOCUMENTS 590841  4/1959  Italy .................................... 358/93

*Primary Examiner*—Randall L. Green
*Attorney, Agent, or Firm*—Thomas Langer

[57] ABSTRACT

An apparatus is disclosed for displaying a video program in an automobile to backseat passengers. The apparatus includes one portion which securely accomodates a TV. To it is rotatably coupled a panel which securely accomodates the VCR and can be swung against the first portion to form a space for protecting the the TV and VCR from damage. One embodiment includes a padded head portion and two panels respectively suspended therefrom by a hinge. The rearward surface of the head portion has an opening in which a television set is secured and through which the screen is visible. Padding in the head is provided for passenger safety. Audio is available from an assembly mounted on the rear panel. Video tape playback is provided by a VCR mounted on the front panel. All the components are combined in a single unit to be easily installed into and removed from the automobile. The panels are sized so that when both are swung upward into the folded position, the rear panel protects the screen of the television set and the front panel positions the VCR in a space formed between the two panels. In another embodiment, two panels form the main elements. One panel accomodates a flat panel screen type of TV and the other panel holds the VCR and an audio assembly. The two panels are hingeably connected to each other so they can be folded to form a space therebetween into which the TV and VCR are placed.

15 Claims, 4 Drawing Figures

PORTABLE VIDEO AND AUDIO EQUIPMENT HOLDER FOR USE IN AN AUTOMOBILE

BACKGROUND OF THE INVENTION

This invention is directed to an apparatus for holding video and audio equipment and, more particularly, to a portable holder for retaining therein a television set ("TV") along with associated equipment such as a video recorder ("VCR") and a speaker and/or jack system which can readily be installed in an automobile and just as readily removed therefrom.

Having the capability of viewing video programming is useful to the backseat passenger travelling in an automobile under a variety of situations. For example, the busy executive on his way to or from work can have the opportunity in his chauffer-driven limousine to watch previously recorded off-the-air programming which he would otherwise miss. Alternatively, he might use the time to view a previously recorded business or educational presentation by operating a VCR installed in his limousine. Another example of a usage to which such equipment can be put is entertainment, particularly on a long trip. Since passengers, particularly children, often get bored during long automobile trips, a TV would provide some companionship and entertainment as a diversion from the cramped quarters and unchanging scenery. Programs could be plucked off the air in strong reception areas and recorded for later playback or commercially available prerecorded tapes could be played on a VCR carried in the automobile.

Limousines are available with built-in equipment designed for this purpose. Space is normally not a problem in a roomy limousine. However, a typical family automobile does not have the space needed to permanently accomodate the necessary equipment. Accordingly, some type of holder is required which can provide the sought viewing and listening features while also being portable so that it is readily and conveniently installable into and removable from the automobile. Its removability is particularly advantageous if the automobile is left under circumstances (e.g. garage, bad neighborhood) where theft of the equipment might occur.

One approach that has been proposed for this purpose is disclosed in U.S. Pat. No. 4,383,626 issued on May 17, 1983 to the present inventor. It uses a frame which is shaped to fit on the backrest of the front seat. Attached to the frame is a platform which can be raised to a horizontal position and on which the TV can be placed. The platform can be folded against the frame when the apparatus is not in use. Although this approach has several advantageous features, it also suffers from some deficiencies. Firstly, when the TV rests on the platform, it is completely exposed within the automobile. No covering or padding is provided for the edges and corners of the TV. Should a passenger come into forceful contact with the TV, such as during an automobile collison, the edges and corners of the TV can cause injury to occur. Secondly, installation and removal of the equipment is time consuming and awkward, partly because separate handling of the frame and TV is involved. Besides the resultant inconvenience, the TV and VCR are unprotected while being carried into and from the automobile. Each can, thus, be banged against something, particularly in the relatively tight confines of an automobile interior, or it can even be dropped and damaged. Thirdly, the frame does not include means to conveniently transport it, such as a handle or grip, so that carrying it around is awkward. Finally, the frame is rather bulky even with the platform folded down. Its transport and storage are, therefore, inconvenient.

SUMMARY OF THE INVENTION

The primary object of the invention is to provide a portable holder for video and audio equipment for use in a family type of automobile.

It is another object of the invention to provide a portable holder for video and audio equipment for use in a family type of automobile which can be conveniently and quickly installed into and removed from the automobile.

A further object of the invention is to provide a portable holder for video and audio equipment for use in a family type of automobile which can accomodate a TV and a VCR along with suitable speaker and headphone units.

Still another object of the invention is to provide a portable holder for video and audio equipment for use in a family type of automobile which is sturdy, relatively inexpensive and easy to manufacture.

Yet another object of the invention is to provide a portable holder for video and audio equipment for use in a family type of automobile which is easy to transport and protects the TV and VCR during such transport.

One other object of the invention is to provide a portable holder for video and audio equipment for use in a family type of automobile which combines all the video and audio components in a single unit.

Still a further object of the invention is to provide a portable holder for video and audio equipment for use in a family type of automobile which protects the passengers from injury should they collide with the equipment.

To accomplish these and other objects, the invention is directed to an apparatus used for providing video programming to passengers in the backseat of an automobile. The apparatus is relatively small and portable so that it can readily be installed into and removed from the automobile. It is comprised of a holder having one portion for securely accomodating the TV and rotatably connected to another portion which securely accomodates the VCR. The two portions can be folded against each other so that the TV and VCR are positioned between them thus being protected from damage during transport.

In one specific embodiment, its three main elements are a head portion, front panel and rear panel. A TV is accomodated in the head portion and its face is visible through an opening in the rear surface of the head portion. The panels are rotatably attached to the head portion, as by a hinge. Taped programming is available from a VCR attached to the front panel and audio is provided by an assembly attached to the rear panel. When the panels are swung upward, the TV is covered by the rear panel and the VCR fits into a space formed by the panels. Thus, these sensitive and expensive components are protected from damage during transport. The padding in the head portion around the TV provides passenger safety in that no edges or corners are left exposed. Openings in the panels serve as handles to facilitate carrying the apparatus. With this arrangement, a unitary body is provided which holds all the components necessary for audio and video in a manner to enhance passenger safety while facilitating its installation into and removal from the automobile.

In another embodiment of the invention, the holder includes only two panels as its main elements. One panel holds the TV which is of the flat-panel screen type. The other panel has attached to it the VCR and an audio assembly. A hinge connects the two panels to each other. Two spaced hooks at one end of the former panel can be placed on the front seat backrest to help secure holder. It is particularly well suited for bucket type seats where the first above-mentioned embodiment could not be used. The hooks accomodate the headrest between them. When the holder is being transported outside of the automobile, the panels are folded against each other thereby placing the TV and VCR between them for protection. The hooks can be used as handles for carrying the assembly.

DETAILED DESCRIPTION OF THE PREFERRED EMBODIMENT

Figure 1:
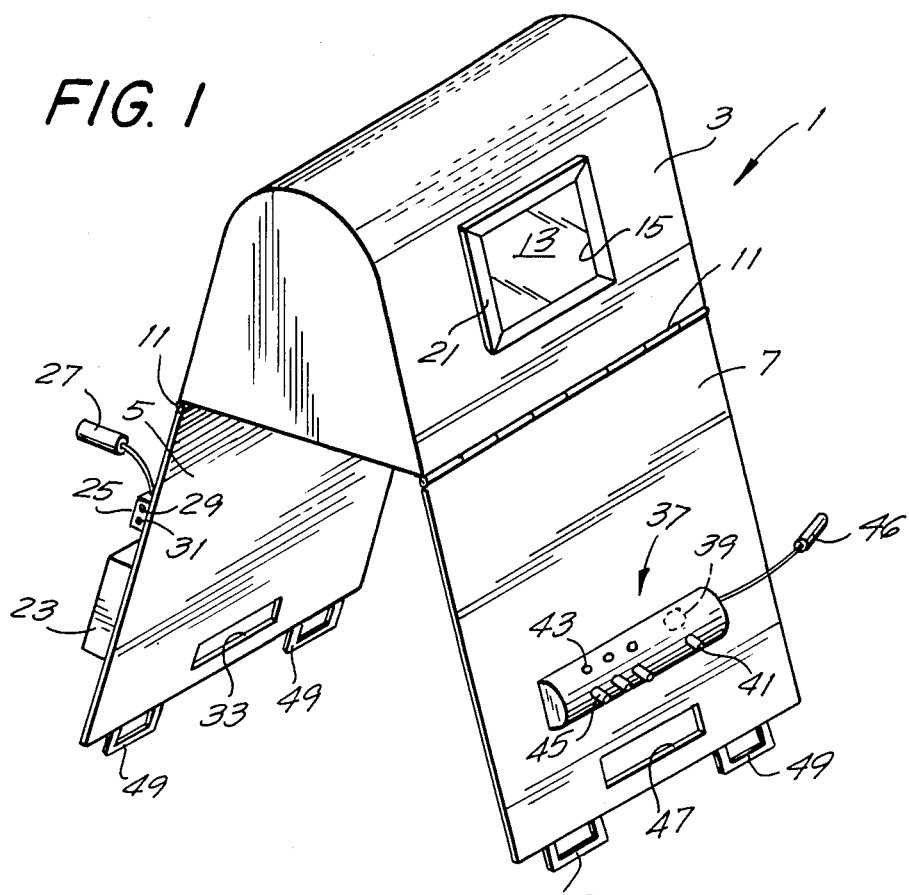
FIG. 1 is a perspective view of one embodiment of the apparatus constructed according to the invention.

The first embodiment constructed in accordance with the invention is designed to fit in the middle of the front seat between the driver and passenger seats. It is shown in FIG. 1 to include holder 1 having as its three main parts head 3, front panel 5 and rear panel 7. Holder 1 is adapted to fit on the backrest (not shown) of the front seat of an automobile. Accordingly, the bottom surface 9 (see FIG. 2) of head 3 rests directly on top of the backrest. Front panel 5 is suspended at one edge from head 3 and lies on the front-facing side of the backrest. Rear panel 7 is also suspended at one edge from head 3 to be behind the backrest between it and the back seat. Both the front and rear panels are connected to head 3 by way of a hinge 11 which permits rotation of the panels relative to the head for reasons discussed in detail below.

Head 3 is in the shape of a hump and in its interior it contains resilient, padding-type material such as foam. Head 3 also carries inside it a video monitor referred to above as a TV. The face, 13, of the TV is visible in opening 15 on the back wall of head 3. Although a variety of screen sizes can be used, a 5 in. screen (measured diagonally) is preferred. The TV can be of the cathode ray type in which case its cabinet 17 (see FIG. 2) fits into a suitably sized cavity 19 in the interior of head 3. For this type of TV, head 3 would include a number of vent holes to ventilate heat generated by the TV. Alternatively, a flat panel, well known type of monitor can also be used. Whichever alternative is selected, the TV is retained securely in head 3. Although conceivably cavity 19 could be manufactured to accomodate a TV from a number of manufacturers and to be installable by the user, it is preferable to customize it for a particular TV. Thus, holder 1 is manufactured with the TV built in. This is done in conventional fashion, and no provision of further details is deemed necessary. Better safety results from such an arrangement because the edges and corners of the TV are more completely covered and the TV is more securely retained in place.

In addition to the protection provided by head 3, padding strips 21 are mounted along the periphery of TV face 13 to provide some impact protection. These strips jut out a bit from the surface of head 3 and away from screen 3 so that objects which span the screen cannot dent the padding of head 3 and impact against the screen. With padding strips 21 in place, it is unlikely that such an object would have sufficient force to indent the strips and head 3 sufficiently to damage the screen.

It should be readily apparent from the above that by installing the TV inside a well padded head 3 and with the addition of padding strips 21 a significant measure of passenger safety has been provided. All the sides, corners and edges of the TV are padded to absorb the impact of any bodily part. Moreover, by having the padding strips jut out of the surface of head 3 and screen 13, the screen is also protected to the extent possible since covering its surface to a greater extent is, of course, self defeating if the view is thereby blocked.

Front panel 5 is made of a relatively light, flat, stiff, padded material such as sheet metal or plastic covered with a padding such as Eurethane foam. On it are mounted portable VCR 23 and power supply 25. The VCR is rectangular in shape and can either be attached to panel 5 or built into it. The VCR remains fixed to the holder 1 both during transport of the holder outside of the automobile as well as during use of the equipment in the automobile. Attachment can be provided by including a suitable retainer box, solid or just a frame, into which the VCR can be inserted and then locked in place. The box would have openings which allow access to the VCR controls and enable the insertion and removal of cassettes. Another form of attachment is to fix the back of the VCR itself to the panel 5. Several possible ways of doing this are available as, for example, with bolts or adhesives. The "built-in" alternative is particularly advantageous with the 8 mm format VCR's which are about the same size as a paperback book. With the VCR arranged thusly, a secure and aesthetically pleasing arrangement can readily be provided.

Power supply 25 is connectable to the cigarette lighter by way of plug 27 and runs on the 12 v automobile battery. It includes receptacles 29 and 31 for receiving jacks for associated equipment requiring power. For example, the portable VCR and the TV might be plugged into the receptacles 29 and 31, respectively.

Panel 5 also includes an opening 33 at one free end which is remote from the hinge 11. This opening is large enough to accomodate an adult hand and is used for transporting the apparatus, as discussed in detail below.

Rear panel 7 is made of the same material as the front panel. Audio section 37 is attached to the rear panel. The audio section encases a speaker 39 and its volume control knob 41. Three earphone jacks 43 along with an associated volume control knob 45 for each jack are also included. A plug 46 is connected to jacks 43. It can be inserted into an earphone jack of the TV (not shown) to deactivate the TV speaker and divert the audio signal to jacks 43. An amplifier (not shown) may suitably be included as needed in the audio section to operate the speaker and earphone jacks. The amplifier is connected to power supply 25 by a wire (not shown) preferably run along the inside of apparatus 1. Wires are also needed to connect the audio output of the VCR and/or TV to section 37 to provide the audio signal. These wires (not shown) are also preferably run along the inside of head 3 to prevent snagging and tearing during transport, installation and removal. The audio section is well padded and knobs 41 and 45 protrude minimally from its surface to enhance passenger safety. Rear panel 7 also includes an opening 47 similar to opening 33 in the front panel, and they both serve the same purpose.

Both the front and rear panels include brackets 49 along their bottom edge. These are used to secure the holder 1 to the front seat. For example, the seat belts used for the center seat position, which is obviously unoccupied, can be threaded through the brackets and tightened to hold the holder tightly against the seat. Alternatively, clips can be used which can pinch the seat material at any desired point to secure the holder to the seat. Other arrangements will be readily apparent to attach this holder to the front seat.

Figure 2:
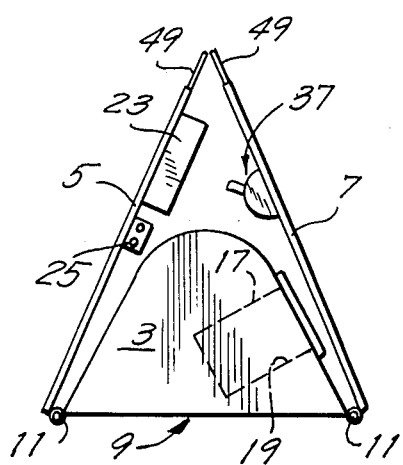
FIG. 2 is a side elevational view of the apparatus shown in FIG. 1 but drawn to a smaller scale and with its panels folded for transport.

As best shown in FIG. 2, holder 1 can be folded into a compact, easy to carry shape. The front and rear panels are swung upward by rotating them on hinges 11. Both panels will be rotatable until their free ends meet above head 3. In that position, rear panel 7 covers screen 13 and absorbs any damaging forces resulting from the shock of an impact. Moreover, pad strips 17 which protrude from the surface of head 3 also cushion the shock. Also, VCR 23 fits into a triangular space defined by panels 5 and 7 on the sides and head 3 on the bottom. It is, thus, also protected from damage. To facilitate carrying the holder, opening 33 and 47 in panels 5 and 7, respectively, serve as handles through which a person can slip his hands. In the thus indicated folded position, the vulnerable components, namely the TV and VCR are well protected should the holder be banged against something.

In use, holder 1 is initially folded into the position depicted in FIG. 2 for convenient and safe transport to the automobile. Installation involves swinging down front panel 5 and inserting the holder through the rear door of the automobile. Advancing the holder into the interior of the automobile places the front panel on the backrest of the front seat and then it can be allowed to drop toward the seat as head 3 is rested on the top of the backrest. The preferred location is in the middle of the seat between the driver and passenger. In this position, the back panel dangles down toward the floor of the rear seat. Brackets, or clips, 49 are then used to secure the holder to the front seat. With the front and rear panels anchored to the automobile, the holder is snug against the backrest and cannot fly off during a sudden stop or a sharp turn. This procedure is simply reversed for removal of the holder from the automobile.

With holder 1 installed in the automobile, power is connected by to it by inserting plug 27 into the cigarette lighter. Suitable plugs and/or wires can also be connected to the power supply 25 from the TV, VCR, and/or audio section. If the TV speaker is to be used, then the TV volume control (not shown) is set as desired. However, the audio signal can be diverted from the TV to speaker 39 by inserting plug 46 into the earphone jack on the TV. This may be necessary if the speaker on the particular model of TV used is located on the set such as to be muffled by head 3. In such a case, speaker 39 serves as a remote speaker for the TV. If, however, the viewing passenger wishes not to disturb his companions, then earphones (not shown) can be plugged into jacks 45 for quiet listening.

Figure 3:
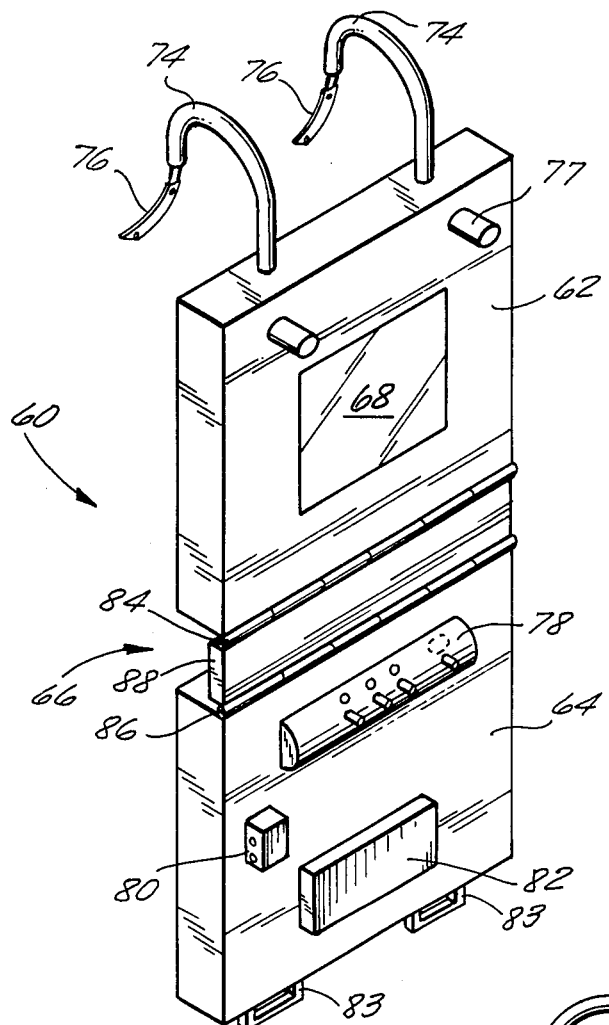
FIG. 3 is a perspective view of another embodiment of the invention.
Figure 4:
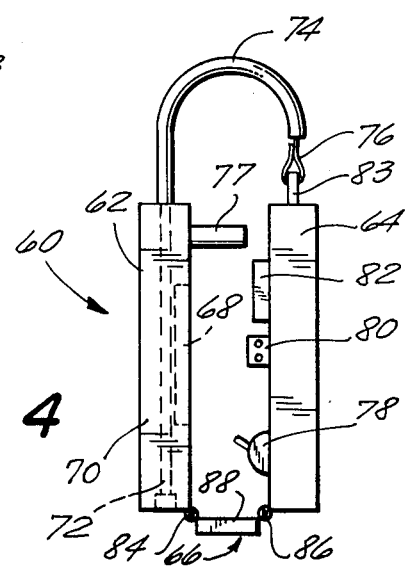
FIG. 4 is a side elevational view of the apparatus shown in FIG. 3 with its panels folded for transport and/or storage.

A second embodiment of the invention is shown in FIGS. 3 and 4. It is particularly suited for automobiles with bucket seats and having no backrest between the driver and passenger seats. Such a seat does not have the support necessary to accomodate the above-described first embodiment. Holder 60 includes panel 62 and panel 64 which are connected to each other by hinge means 66. As best shown in FIG. 3 which depicts holder 60 deployed for use in an automobile, panel 62 accomodates TV 68 which is of the flat panel screen type. Panel 62 has a thickness sufficient to accomodate the TV and to provide room for padding 70 (see FIG. 4). Panel 62 also includes a stiffening means 72 to provide it with shape and strength. As in the previous embodiment, it can be made of sheet metal or plastic.

Attached to the top panel 62 are hooks 74 which are curved to grip the top of the front seat backrest. They are spaced from each other to accomodate the headrest therebetween. Panel 62 and hooks 74 are attached to each other by means which allow the hooks to swivel around the attachment point. For example, a ball and socket arrangement (not shown) would do. Even simpler than that, a threaded pin protruding from the panel can be inserted through a hole in a flat portion of the hooks (not shown) and a nut screwed on loosely enough to make an attachment yet still enable rotation of the hooks around the pin. Other such arrangements will be readily apparent. The free tip of hooks 74 supports a strap 76 used for a purpose to be discussed in detail below. Stops 77 are also attached to panel 62 toward its top corners and serve a purpose to be explained below. Each stop is made of a resilient material soft enough not to cause bodily harm should a person be thrown against it.

Panel 64 is made of the same materials as panel 62 to provide shape strength and padding. An audio assembly 78 and power source 80 are attached to panel 64. These are the same as audio assembly 37 and power source 25 shown in FIG. 1 for the first embodiment. Therefore, no further details on these components need to be repeated here. Also attached to panel 64 is VCR 82. It is preferably of the 8 mm format type which, as mentioned above, is very compact. It can be attached onto the panel or built in, as discussed above with reference to the first embodiment. Brackets, or clips, 83 are attached at the bottom of panel 64. These serve the same purpose as brackets 49 disclosed with reference to the first embodiment.

Hinge means 66 connects panels 62 and 64 to each other. It includes two hinges, 84 and 86, with a bar 88 between them. Hinge 84 is connected to panel 62 and hinge 86 is connected to panel 64. A hinge arrangement of this type permits not only rotational movement between the two panels, but also forms a space between them when the panels are folded against each other, as shown on FIG. 4. The width of the space is determined by the size of bar 88.

In use, holder 60 in its extended position is simply placed on the backrest by positioning hooks 74 to span the headrest between them. Brackets, or clips, 83 are secured to anchor the holder securely to the automobile so that it remains in place even during sudden stops or sharp turns. Power source 80 is coupled to the cigarette lighter, and any of the components requiring power are coupled to the power source in the same manner as discussed above with reference to the first embodiment. When holder 60 is removed from the automobile, panels 62 and 64 are folded so that they face each other with the TV, VCR, audio assembly and power source being in the space formed between them. Hooks 74 are swiveled around by 180 degrees, and straps 76 are attached to brackets 83. Hooks 74 can now serve as handles for conveniently carrying the holder. It should be noted that the VCR and TV are protected from damage by being on the inside of the folded assembly and, in addition by the padding on the outside of the panels. Stops 77 keep panel 64 away from panel 62 so that the VCR 82 and/or power source 80 do not damage screen 80.

Although the preferred embodiments of the invention have been disclosed above, it will be apparent that various modifications can readily be made to it. For example, as to the first embodiment, the bottom 9 of head 3 and panels 5 and 7 can be shaped more in conformity to the outline of the backrest rather than being relatively straight as depicted in the drawings. Also. the shape of head 3 can be altered to angle the TV differently in relation to the backseat viewer. In addition, hinges 11 can be replaced by a fold or seam which also allows the panel to swing upon relative to head 3. Furthermore, instead of using plug 46 to activate speaker 39 and earphone jacks 43, a permanent connection to the TV can be used along with a switch to selectively listen either to the TV speaker or to the speaker 39/jacks 43 arrangement. Some of these changes can also be made to the second embodiment. In addition, more padding can be provided around the TV such as with padding strips arranged similarly to those shown in the first embodiment. These and other such modifications are intended to, and do, fall within the scope of the invention as defined by the following claims.

I claim:

1. Apparatus for use on the front seat of an automobile to hold a video display device, such as a television set, utilized for viewing by back seat passengers, comprising:
   means adapted for resting on the backrest of the front seat and having an opening in a rear surface thereof for securely receiving said video display device, the face of said device being visible through said opening;
   a first panel rotatably mounted at one end to the rear surface of said video display device receiving means, said first panel being positioned on the receiving means and sized so that when it is rotated upward it covers the face of said device;
   means to secure the video display device receiving means to the automobile;
   a second panel rotatably connected at one end to a front surface of said video display device receiving means and including means to securely retain a portable video player therein;
   an audio source carried on said first panel; and
   power source means for applying electric power to the video display device, the audio source, and the portable video player.

2. The apparatus of claim 1, wherein said video display device receiving means comprises a padded head portion, said first panel being mounted to the rear surface of said head portion.

3. The apparatus of claim 2, wherein the respective ends of said first and second panels remote from the head portion include an opening sized to accomodate a person's hand, said panels being sized so that when both are swung upward the openings are aligned adjacent to each other and can be gripped to carry the apparatus.

4. The apparatus of claim 1, further including padding strips mounted on the periphery of the face of said video device.

5. The apparatus of claim 1, wherein said audio source is carried on the side of said first panel which faces the video display reeiving means when the first panel is rotated upward.

6. The apparatus of claim 1, wherein said audio source is attached to the first panel and adapted to be coupled to the television set.

7. The apparatus of claim 6, wherein said power source means is coupled to the automobile battery.

8. The apparatus of claim 2, wherein said video recorder retaining means is attached to the second panel so that it fits into a space formed on its sides by the front and rear panels and on its bottom by the head portion when both panels are swung upward.

9. The apparatus of claim 8, further including hinge means between the head portion and, respectively, the first and second panels to permit rotation of the panels relative to the head portion.

10. Apparatus for use on the front seat of an automobile to hold a video display device, such as a television set, utilized for viewing by back seat passengers, comprising:
    means adapted for resting on the backrest of the front seat and having an opening in a rear surface thereof for securely receiving said video display device, the face of said device being visible through said opening;
    a first panel rotatably mounted at one end to the rear surface of said video display device receiving means, said first panel being positioned on the receiving means and sized so that when it is rotated upward it covers the face of said device;
    means to secure the video display device receiving means to the automobile;
    wherein the video display device receiving means comprises a second panel;
    hooks adapted to fit on the front seat backrest and rotatably coupled to an upper end of said second panel remote from the first panel;
    an audio source carried on one of said first and second panels; and
    power source means for supplying electric power to the video display device and the audio source.

11. The apparatus of claim 10, further including hinge means connecting the first and second panels.

12. The apparatus of claim 10, wherein the television set is a flat panel screen type.

13. The apparatus of claim 12, further comprising a video player carried on said first panel and coupled to said power source means.

14. The apparatus of claim 13 wherein said video player is secured to the side of said first panel which faces the second panel when the two are swung toward each other.

15. The apparatus of claim 14, wherein said audio source is secured to the side of said first panel which faces the second panel when the two are swung toward each other.

* * * * *